(12) United States Patent
Nakano et al.

(10) Patent No.: US 7,555,944 B2
(45) Date of Patent: Jul. 7, 2009

(54) PHYSICAL QUANTITY SENSOR

(75) Inventors: Hiroshi Nakano, Hitachi (JP);
Masahiro Matsumoto, Hitachi (JP);
Masamichi Yamada, Hitachinaka (JP);
Keiichi Nakada, Hitachinaka (JP);
Izumi Watanabe, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/353,937

(22) Filed: Feb. 15, 2006

(65) Prior Publication Data
US 2006/0220662 A1 Oct. 5, 2006

(30) Foreign Application Priority Data
Mar. 15, 2005 (JP) .............................. 2005-072818

(51) Int. Cl.
*G01F 1/68* (2006.01)
(52) U.S. Cl. .................................. 73/204.26
(58) Field of Classification Search ............... 73/204.26
See application file for complete search history.

(56) References Cited

U.S. PATENT DOCUMENTS

| | | | | |
|---|---|---|---|---|
| 4,347,479 | A * | 8/1982 | Cullet | 324/706 |
| 4,833,912 | A * | 5/1989 | Ohta et al. | 73/118.2 |
| 4,936,145 | A * | 6/1990 | Hohenstatt | 73/204.26 |
| 5,708,205 | A * | 1/1998 | Yamada et al. | 73/204.26 |
| 6,557,411 | B1 * | 5/2003 | Yamada et al. | 73/204.26 |
| 6,626,037 | B1 | 9/2003 | Wado et al. | |
| 6,705,160 | B2 * | 3/2004 | Iwaki et al. | 73/204.26 |
| 6,923,053 | B2 * | 8/2005 | Yamada et al. | 73/204.26 |
| 6,925,866 | B2 * | 8/2005 | Watanabe et al. | 73/204.26 |
| 2004/0103720 | A1 | 6/2004 | Chou | |

FOREIGN PATENT DOCUMENTS

EP 1 116 939 A2 7/2001
JP A 2001-21401 1/2001

OTHER PUBLICATIONS

Chinese Office Action dated Aug. 3, 2007 with English translation (Five (5) pages).
European Search Report dated Aug. 26, 2008 (Eleven (11) pages).

* cited by examiner

*Primary Examiner*—Harshad Patel
(74) *Attorney, Agent, or Firm*—Crowell & Moring LLP

(57) ABSTRACT

A highly accurate physical quantity sensor which can ensure reliability in strength and reduce resistance changes caused by stresses. Assuming, with respect to stress σ imposed on a substrate in a predetermined direction (e.g., direction in which maximum stress is imposed), a parallel direction to be a horizontal direction and a perpendicular direction to be a vertical direction, each of resistors of the sensor has a horizontal resistance component Rl and a vertical resistance component Rt. When a ratio of a piezoresistance coefficient πl of the horizontal resistance component Rl, which is provided when the stress imposed on the substrate is applied to the horizontal resistance component Rl, to a piezoresistance coefficient πt of the vertical resistance component Rt, which is provided when the stress is applied to the vertical resistance component Rt, is πl:πt=−n:1 (n:integer), a resistance value ratio of the vertical resistance component Rt to the horizontal resistance component Rl is set substantially equal to the ratio of the piezoresistance coefficient πl to πt.

10 Claims, 14 Drawing Sheets

PHYSICAL QUANTITY SENSOR

BACKGROUND OF THE INVENTION

1. Field of the Invention

The present invention relates to a sensor including a resistor formed on a substrate and detecting a predetermined physical quantity. More particularly, the present invention relates to a physical quantity sensor which is applied to, for example, a flow sensor for detecting the flow rate of a fluid, an acceleration sensor, and an inclination sensor.

2. Description of the Related Art

As a flow sensor for detecting an intake air amount in an internal combustion engine such as an automobile, it is proposed to manufacture a sensor device on a semiconductor substrate made of, e.g., silicon (Si) by using the micromachining technology. That type of flow sensor is advantageous in that it can be mass-produced at a low cost, has a small size, and can be driven with low electric power. That type of flow sensor is mainly practiced as an air flow sensor employing a heating resistor, which can directly measure a mass flow rate.

In known heating-resistor flow sensors of semiconductor type, as disclosed in, e.g., Patent Document 1 (JP,A 2001-021401), a silicon substrate is partly removed to form a diaphragm structure having a cavity, and a heating resistor and a temperature compensation resistor are formed on the diaphragm. The sensor of such a structure has the problem that the mechanical strength is low and flexion may occur due to unbalance among internal stresses in a diaphragm section. According to the technique disclosed in Patent Document 1, a rigid member is disposed in the diaphragm section to suppress flexion of the diaphragm, thereby improving reliability of a sensor device and increasing accuracy in measurement of the air flow rate.

SUMMARY OF THE INVENTION

In many physical quantity sensors, a sensor device is fixed using an adhesive. Also, a sealant made of, e.g., epoxy is used to protect wire bonding through which an electric signal is taken out from the sensor device. Those adhesive and sealant are expanded and contracted depending on changes of the ambient temperature, thus generating stresses. Further, stresses imposed from a mount member containing a drive circuit, etc. of the sensor device are also transmitted to the sensor device. If stresses are caused in the sensor device, the stresses are applied to a resistor formed on the sensor device, and a resistance value of the resistor is changed. Particularly, when the resistor is made of a semiconductor such as silicon, it has a larger piezoresistance coefficient and causes a larger resistance change. The larger resistance change becomes a factor deterioraing the measurement accuracy.

The thermal air flow sensor disclosed in JP,A 2001-021401 is intended to suppress flexion caused by unbalance among internal stresses generated in the diaphragm. The flexion caused by the internal stresses is therefore reduced, but stresses imposed from the exterior are not taken into consideration. Also, the stresses applied from the mount member to the sensor device affect the whole of the sensor device in addition to the diaphragm section. Accordingly, those stresses affect not only the resistor used for detecting the physical quantity, but also a wiring section for taking out the electric signal. In other words, the influence of stresses generated from the member for mounting the sensor device is not yet overcome.

An object of the present invention is to provide a physical quantity sensor which can reduce resistance changes due to stresses imposed on a sensor device and can ensure highly accurate measurement.

The physical quantity sensor of the present invention is basically intended to achieve the above object with the following features.

(1) According to one aspect of the present invention, a physical quantity sensor in which a resistor for measuring a physical quantity is formed on a substrate in a pattern of strips is constituted as follows.

Stresses are imposed on a substrate in various directions. Assuming, with respect to stress $\sigma$ imposed in predetermined one of the various directions (e.g., direction in which maximum stress is imposed), a parallel direction to be a horizontal direction and a perpendicular direction to be a vertical direction, the resistor has a horizontal resistance component Rl and a vertical resistance component Rt. When a ratio of a piezoresistance coefficient $\pi l$ of the horizontal resistance component Rl, which is provided when the stress imposed on the substrate is applied to the horizontal resistance component Rl, to a piezoresistance coefficient $\pi t$ of the vertical resistance component Rt, which is provided when the stress imposed on the substrate is applied to the vertical resistance component Rt, is $\pi l : \pi t = -n:1$ (i.e., $\pi t/\pi l = -1/n$, n:integer), a resistance value ratio of the horizontal resistance component Rl to the vertical resistance component Rt is set substantially equal to an absolute value of the ratio of the piezoresistance coefficient $\pi t$ to $\pi l$ ($Rl/Rt \approx |\pi t/\pi l|$).

When the resistor is made of, e.g., polycrystalline silicon doped with impurities, the relationship between $\pi l$ and $\pi t$ is given by $\pi l = -3\pi t$. Stated another way, with respect to the stress $\sigma$ imposed on the substrate, the piezoresistance coefficient $\pi l$ of the horizontal resistance component Rl is changed in a negative direction at a rate triple that at which the piezoresistance coefficient $\pi t$ of the vertical resistance component Rt is changed (i.e., $\pi l : \pi t = -3:1$).

Accordingly, by setting the resistance value ratio of the vertical resistance component Rt to the horizontal resistance component Rl to be Rt:Rl=3:1, the resistance changes caused by the stress $\sigma$ can be canceled and total change of the resistor can be reduced. This can be expressed by the following formula:

$$\Delta R = (Rl\pi l + Rt\pi t)\sigma$$

In the case of $\pi l : \pi t$ being n:1 (e.g., 3:1), by setting Rt:Rl to be n:1±0.5 (e.g., 2:1 or 3:0.5), an error can be halved ($\Delta R=0.5\sigma$). Therefore, when it is desired to reduce a stress error of the sensor by at least half, Rt:Rl is set within the range of from n:1 to n:1±0.5.

Further, when the resistor is formed on a semiconductor substrate, variations of resistance values can be reduced by forming the resistor including Rl and Rt so as to have a substantially constant line width. The resistance value ratio of Rl to Rt can be simply adjusted by a method of changing respective lengths or widths of the resistance components Rt and Rl. However, the resistance value ratio of Rl to Rt is preferably adjusted by changing the resistance lengths while the resistance widths are kept the same. The reason is as follows. To suppress a reduction in sensitivity of the wiring resistance, the resistance value of a detection section of the sensor is required to be increased and the line width of the resistor is narrowed correspondingly. When the resistor having a thinner pattern is etched, the influence of variations (overetching) in etching amount becomes larger. By forming the resistor so as to have a substantially constant line width, the resistance ratio of Rl to Rt can be kept the same in spite of overetching, whereby high accuracy is ensured.

(2) According to another aspect of the present invention, in a physical quantity sensor including a resistor formed on a substrate (the resistor being formed of one resistor or two or more serial resistors), a power-supply side terminal and a ground side terminal of the resistor are branched to at least four terminals in total. By branching the power-supply side terminal and the ground side terminal to four or more terminals, a feedback device for maintaining a power supply voltage and a ground voltage can be connected to the power-supply side terminal and the ground side terminal of each of the resistors, which are connected in series, through the branched terminals.

Therefore, a drive circuit can be constituted such that even when the wiring resistance on the power supply side and the wiring resistance on the ground side of the resistor are changed due to stress distortions, etc., the changes caused by distortions of the wiring resistances of the resistor can be ignored. As a result, the influence generated by stresses imposed on a wiring section of the sensor can be reduced.

According to the present invention, the physical quantity sensor is provided which can reduce effects of stresses imposed on the sensor device and ensure highly accurate measurement.

DESCRIPTION OF THE PREFERRED EMBODIMENTS

Preferred embodiments of a physical quantity sensor according to the present invention will be described below with reference to the drawings.

First Embodiment

The first embodiment represents, as one example of the physical quantity sensor, a thermal air flow sensor for measuring the flow rate of intake air in an internal combustion engine of an automobile, etc.

Figure 1:
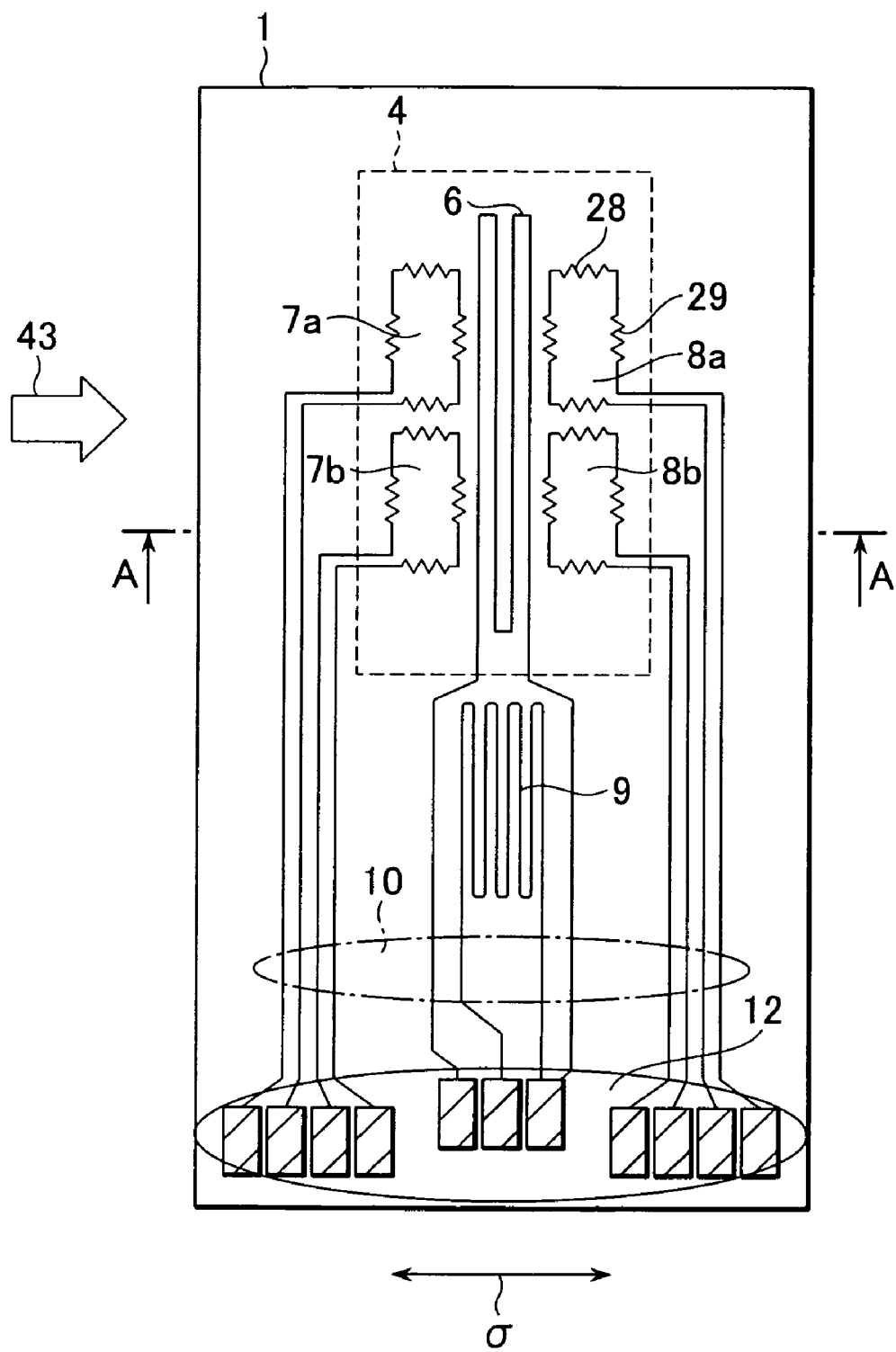
FIG. 1 is a schematic plan view of a sensor device according to a first embodiment of the present invention.
Figure 2:
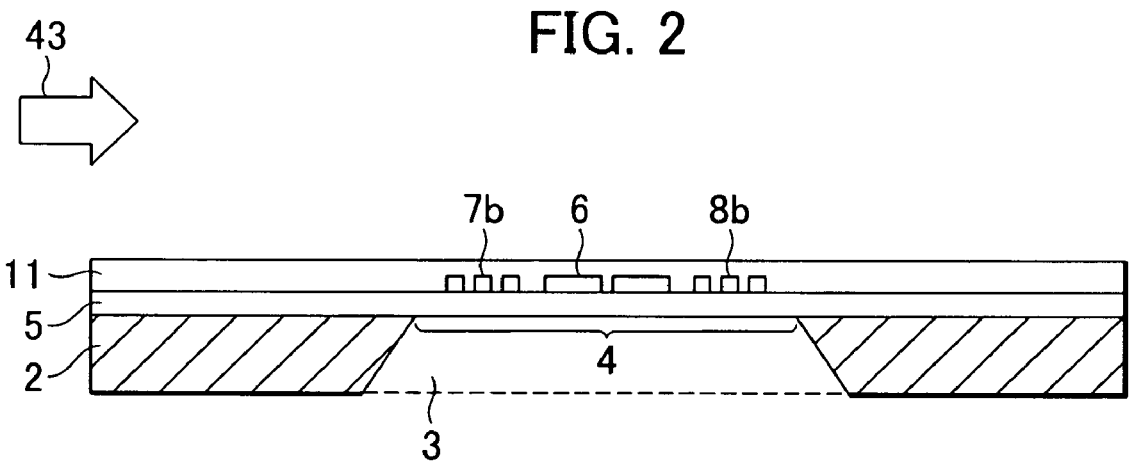
FIG. 2 is a sectional view of the sensor device according to the first embodiment.

FIG. 1 is a schematic plan view of a sensor device of the thermal air flow sensor according to the first embodiment, and FIG. 2 is a sectional view taken along the line A-A in FIG. 1. As shown in these drawings, a sensor device 1 is formed on a semiconductor substrate (base) 2 made of a single-crystalline silicon (Si) wafer as follows.

A cavity 3 is formed in a part of the semiconductor substrate 2 by anisotropic etching. The cavity 3 is in the form of a rectangular hole as viewed in a plan. A diaphragm 4 is formed at one side of the cavity 3. The diaphragm 4 is made of an electric insulating film 5 of silicon dioxide ($SiO_2$) that is formed on one surface of the semiconductor substrate 2 by thermal oxidation or CVD (Chemical Vapor Deposition).

A heating resistor 6 and temperature sensitive resistors 7a, 7b, 8a and 8b, each having temperature dependent characteristics, are formed on the diaphragm 4. Further, another temperature sensitive resistor 9 for compensating air temperature is formed in a position away from the diaphragm 4. Wiring 10 for those resistors is also formed on the substrate 2. Those resistors and wiring are made of polycrystalline silicon and are each formed through steps of forming a polycrystalline silicon layer on the electric insulating film 5 by CVD, for example, and etching it into the desired shape.

More specifically, those resistors are formed by doping phosphorous (P) in n-type polycrystalline silicon by thermal diffusion or ion implantation, for example, so that the desired resistance values and resistance-temperature coefficients are obtained.

Figure 5:
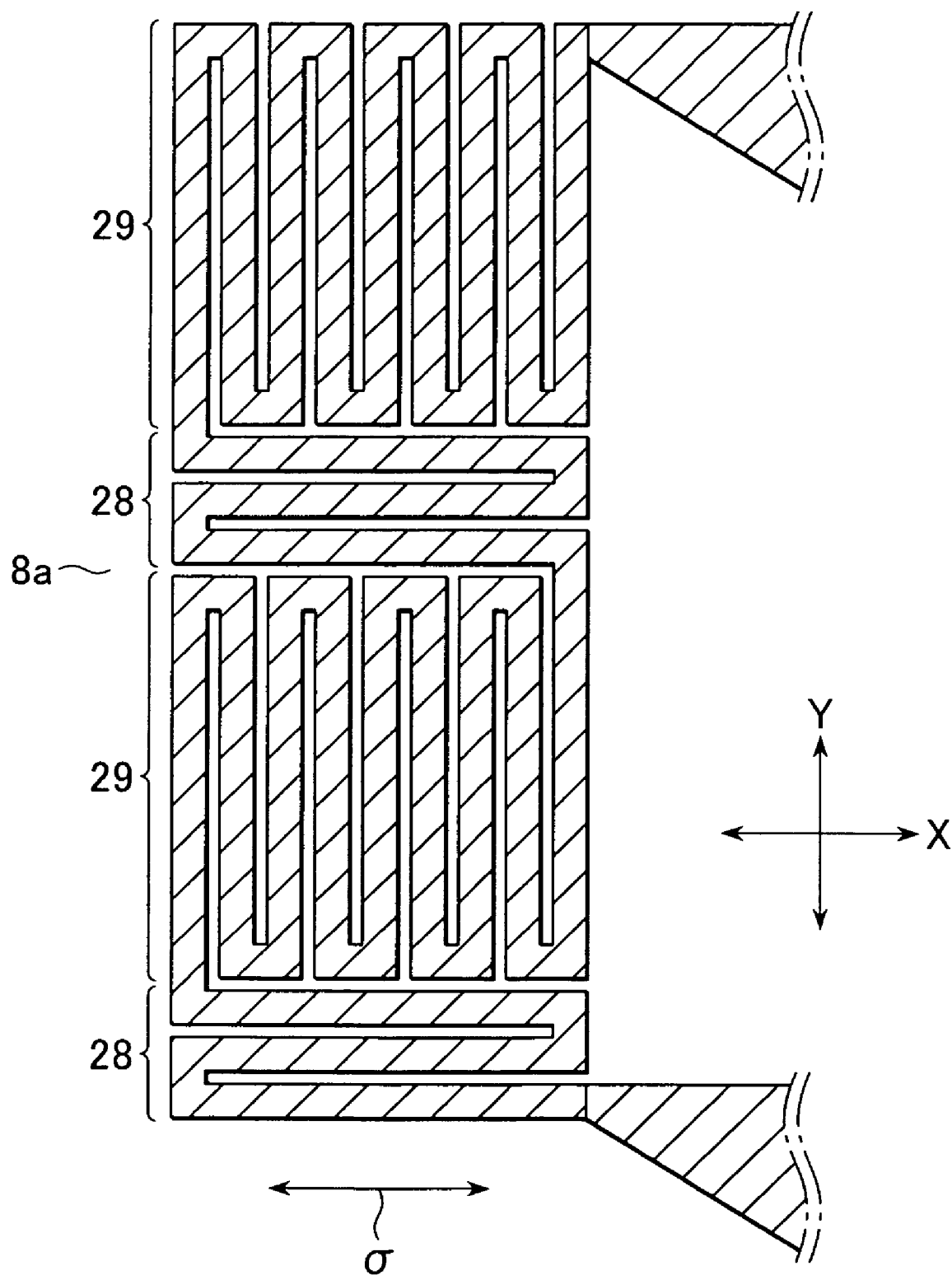
FIG. 5 is a plan view showing one shape of a temperature sensitive resistor in the first embodiment.

Assuming that air flows from the left to right on the drawing as indicated by 43, the temperature sensitive resistors 7a and 7b are arranged upstream of the heating resistor 6, and the temperature sensitive resistors 8a and 8b are arranged downstream of the heating resistor 6. Each of the temperature sensitive resistors 7a, 7b, 8a and 8b is formed in combination of a vertical resistance component 29 and a horizontal resistance component 28 which are orthogonal to each other. One example of the combination is shown in FIG. 5. Here, with respect to stress σ imposed on the substrate 2 in a predetermined direction (the predetermined direction is preferably matched with a direction in which a stress distribution is maximized), a parallel direction is defined to be a horizontal direction (X-direction) and a perpendicular direction is defined to be a vertical direction (Y-direction).

FIG. 5 shows the shape of one (8a) of the temperature sensitive resistors 7a, 7b, 8a and 8b. The temperature sensitive resistor 8a is formed to have such a shape (or length) that a ratio of a resistance value of the vertical resistance component 29 extended in a vertical direction (Y-direction) while being folded repeatedly (i.e., a vertical resistance component Rt) to a resistance value of the horizontal resistance component 28 extended in a horizontal direction (X-direction) while being folded repeatedly (i.e., a horizontal resistance component Rl) is substantially equal to a ratio (n:1) of a piezoresistance coefficient πl of the horizontal resistance component Rl to a piezoresistance coefficient πt of the vertical resistance component Rt. The other temperature sensitive resistors 7a, 7b and 8b are also formed in the same manner. The concrete shape of each temperature sensitive resistor will be described in detail later.

An electric insulating film 11 is formed to protect those resistors. The electric insulating film 11 is obtained by a method of forming silicon dioxide (SiO$_2$) by CVD, for example. Further, aluminum electrodes 12 are formed for connection to respective electrodes of the resistors.

The principle for measurement of an air flow rate using the sensor device 1 will be described below. To measure the air flow rate, the heating resistor 6 is electrically heated and controlled by a bridge circuit, an operational amplifier 15, and a transistor 16 for controlling a heating current, shown in FIG. 3, so that the temperature of the heating resistor 6 is always held higher than the temperature of the temperature compensation resistor 9 for sensing the air temperature by a constant value (details of the circuits will be described later). In such a controlled state, the temperature difference between the temperature sensitive resistors 7 (7a and 7b) and the temperature sensitive resistors 8 (8a and 8b) disposed upstream and downstream of the heating resistor 6, respectively, is measured. When air does not flow, a temperature distribution over the diaphragm 4 is symmetrical about the heating resistor 6. Accordingly, no temperature difference occurs between the temperature sensitive resistors 7a, 7b and the temperature sensitive resistors 8a, 8b. On the other hand, when air flows in the direction indicated by 43 in the drawings, the temperature of the temperature sensitive resistors 7a and 7b disposed upstream of the heating resistor 6 is lowered and the temperature of the temperature sensitive resistors 8a and 8b disposed downstream of the heating resistor 6 is raised, thus causing a temperature difference therebetween. Since resistance values of the temperature sensitive resistors 7a, 7b, 8a and 8b are changed depending on temperatures, an electric signal corresponding to the air flow rate can be obtained by electrically taking out a temperature change as changes of the resistance values.

Also, when air flows in a direction opposed to the direction of the air flow 43, a temperature distribution is reversed to that obtained in the above-mentioned state. The direction of the air flow can be therefore discriminated by comparing the resistance value of the temperature sensitive resistors 7a and 7b with that of the temperature sensitive resistors 8a and 8b.

A drive circuit for driving the sensor device 1 and measuring the air flow rate will be described below.

Figure 3A:
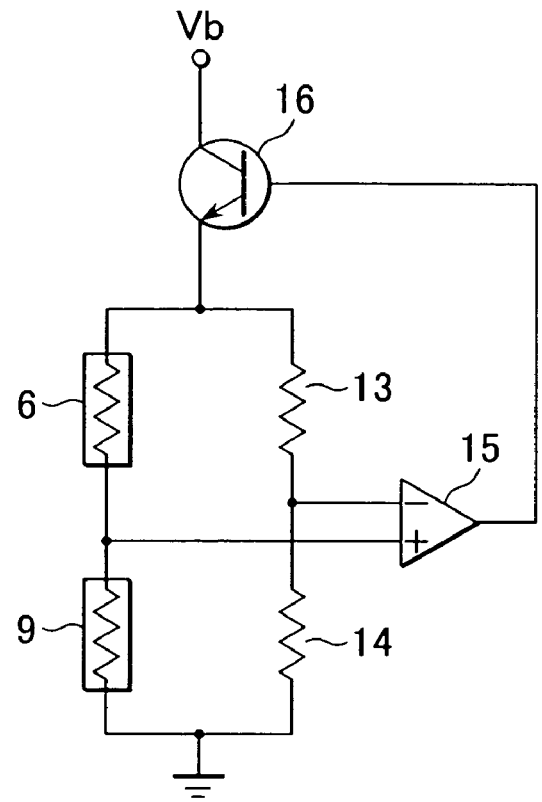
FIGS. 3A and 3B are diagrams showing a drive circuit for the sensor device according to the first embodiment.

FIG. 3A shows a feedback circuit for controlling the temperature of the heating resistor 6. The feedback circuit has a bridge circuit made up of the heating resistor 6, the temperature compensation resistor 9, and fixed resistors 13 and 14. A differential voltage of the bridge circuit is detected by the operational amplifier 15, and the heating current is controlled through the transistor 16. The temperature of the heating resistor 6 rises with the heating current, and the resistance value of the heating resistor 6 is changed correspondingly. A resistance value ratio of the heating resistor 6 to the temperature compensation resistor 9 can be adjusted by adjusting respective resistance values of the fixed resistors 13 and 14. The temperature of the temperature compensation resistor 9 is substantially equal to the air temperature. The resistance value ratio of the heating resistor 6 to the temperature compensation resistor 9 corresponds to the relationship between the temperature of the heating resistor 6 and the air temperature. Accordingly, the temperature of the heating resistor 6 can be always held higher than the air temperature by a constant value.

Figure 3B:
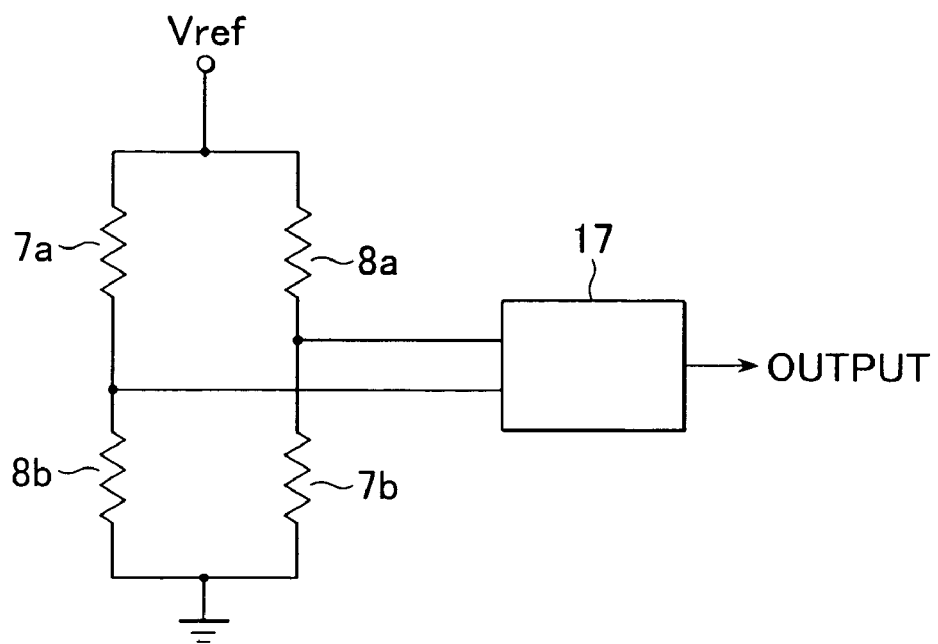

FIG. 3B shows a circuit for detecting a temperature difference between the upstream and downstream sides of the heating resistor 6, and outputting an electric signal representing the air flow rate. This circuit is in the form of a bridge circuit made up of the temperature sensitive resistors 7a, 7b, 8a and 8b, and the detected signal is outputted through a computing unit 17. When an air flow is generated in the direction as indicated by 43 in FIG. 1, the resistance values of the temperature sensitive resistors 7a and 7b are reduced with a lowering of the temperature, and the resistance values of the temperature sensitive resistors 8a and 8b are increased with a rise of the temperature. Therefore, a differential voltage corresponding to the air flow rate is generated in the bridge circuit. When air flows in the reversed direction, the direction of the air flow can be detected based on a sign of the differential voltage. Additionally, the computing unit 17 can be given with the function of outputting the output of the bridge circuit after modifying it.

Figure 4:
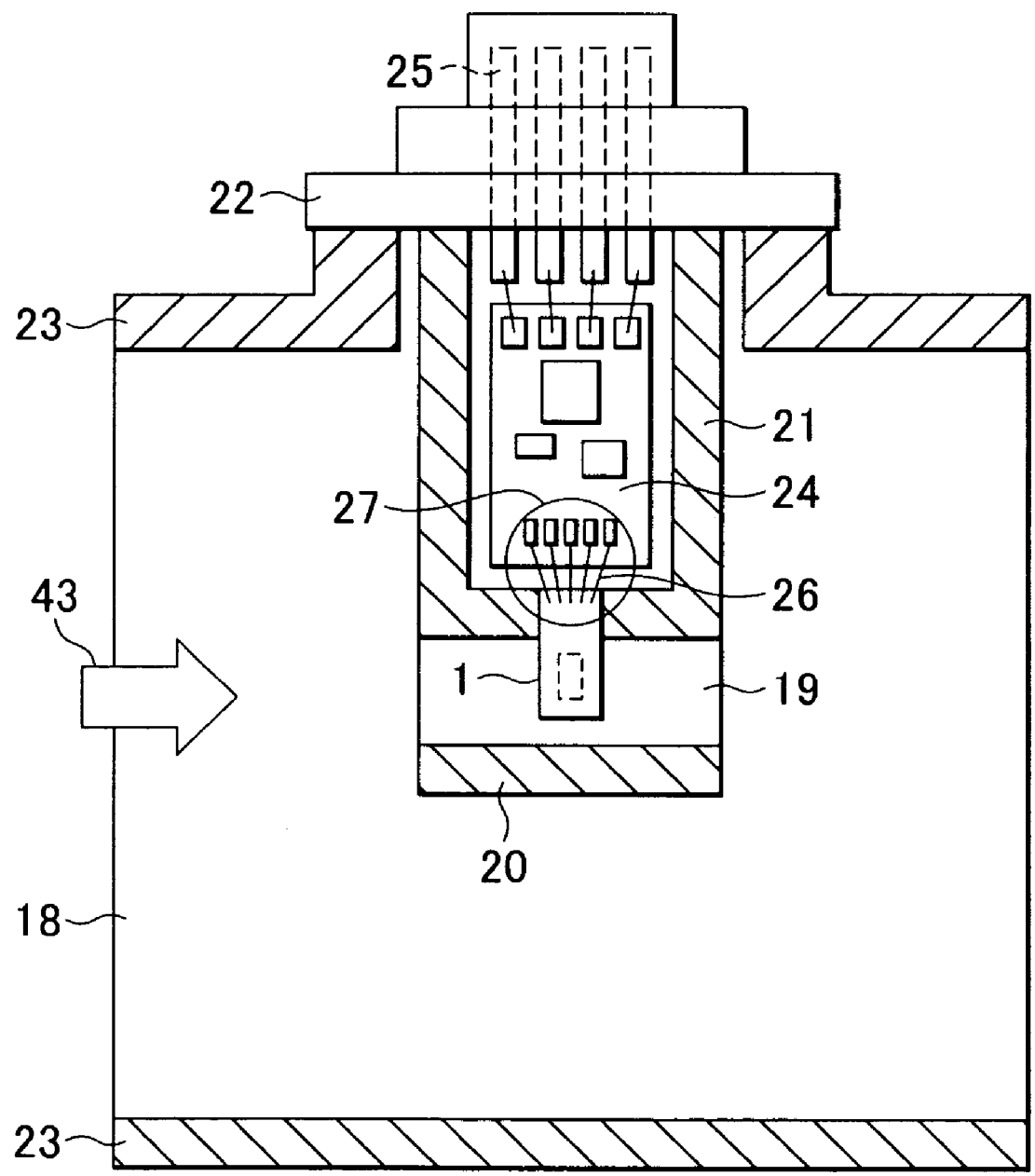
FIG. 4 is a vertical sectional view showing the mount structure for the sensor device according to the first embodiment.

FIG. 4 is a sectional view showing the mount structure for the sensor device 1 when the sensor device 1 is mounted to an intake pipe of an automobile engine to measure the flow rate of intake air. The intake air flows through a main passage 18 of the intake pipe as indicated by an arrow 43, and the sensor device 1 is installed in a sub-passage 19 provided in the form projecting into the main passage 18. A member 20 constituting the sub-passage 19 is supported by a casing 21.

The casing 21 is mounted to a wall surface 23 of the intake pipe by using a support 22. A circuit board 24 is disposed in the casing 21. The drive circuit for driving the sensor device 1 and taking out an air flow signal is mounted on the circuit board 24.

The sensor device 1 is mechanically supported by the casing 21 and is electrically connected to the drive circuit on the circuit board 24 by bonding wires 26. To protect the bonding wires 26, electrodes of the sensor device 1 and the circuit board 24 are covered with a resin, e.g., epoxy. The air flow signal detected by the thermal air flow sensor including the sensor device 1 is taken out through a connector 25 and is supplied to an engine control computer, though not shown, for use in control of a fuel supply amount.

In the thermal air flow sensor thus constructed, an adhesive is coated on the rear side of the sensor device 1 for mounting of the sensor device 1, and a sealant 27 is applied for protection of the bonding wires 26. When the adhesive and the sealant 27 each made of resin are provided in place, the resin has to be hardened in a high-temperature furnace after being applied. In the hardening step, the resin is expanded and contracted, thus generating stresses. The generated stresses are imposed on the sensor device 1. The plurality of resistors 7a, 7b, 8a and 8b are formed on the sensor device 1, and the stresses are applied to those resistors.

Upon application of the stresses, the resistance value of each resistor is changed as expressed by the following formula:

$$\Delta R/R = \pi l \sigma + \pi t \sigma \qquad (1)$$

In the formula (1), $\Delta R/R$ represents a resistance change rate, $\pi l$ represents a piezoresistance coefficient when stress $\sigma$ is applied to the horizontal resistance component 28, and $\pi t$ represents a piezoresistance coefficient when the stress $\sigma$ is applied to the vertical resistance component 29. Although stresses act on the sensor device from various directions, the stress $\sigma$ in a direction indicated by an arrow in FIGS. 1 and 5 is maximum from the structure of the sensor device. Because each resistor in this embodiment is made of polycrystalline silicon, the relationship between the piezoresistance coefficients $\pi l$ and $\pi t$ is expressed by:

$$\pi l = -3\pi t \qquad (2)$$

Particularly, in the case of a semiconductor such as single-crystalline silicon or polycrystalline silicon, the piezoresistance coefficient is relatively large. This means that the stress imposed on the sensor device 1 may become a factor deteriorating the measurement accuracy of the thermal air flow sensor.

A practical method for reducing such an influence of the stress will be described below. In this embodiment, the influence of the stress is reduced by applying the present invention to the temperature sensitive resistors 7a, 7b, 8a and 8b shown in FIG. 1. FIG. 5 is a plan view showing the shape of the temperature sensitive resistor 8a. The other temperature sensitive resistors 7a, 7b and 8b also have the same shape. As shown in FIG. 5, the resistor is formed such that it has a strip-like shape with a constant width and the vertical resistance component 29 (perpendicular to the stress σ) as viewed on the drawing has a length about triple that of the horizontal resistance component 28 (parallel to the stress σ). Accordingly, the relationship between a resistance value R29 of the vertical resistance component 29 and a resistance value R28 of the horizontal resistance component 28 is expressed by:

$$R29=3R28 \quad (3)$$

A ratio of R29 to R28 corresponds to a ratio between the two piezoresistance coefficients expressed by the formula (2).

Also, σ shown in FIG. 5 represents the stress applied to the temperature sensitive resistor 8a. An amount ΔR of resistance change of the temperature sensitive resistor 8a caused by the stress σ is expressed by:

$$\Delta R=(R28\pi l+R29\pi t)\sigma \quad (4)$$

By putting the relationships of the formulae (2) and (3) in the above formula (4), ΔR=0 is resulted. Thus, the resistance change caused by the stress can be reduced by setting the ratio of the resistance value of the vertical resistance component R29 to the resistance value of the horizontal resistance component R28 to be substantially equal to the ratio of the piezoresistance coefficient πl to πt.

When forming the resistors such as the temperature sensitive resistor 8a, the forming process includes patterning by etching. However, the etching amount varies and so does the resistance value because of, for example, narrowing of the resistor width (i.e., overetching). By forming the resistor at a constant width, the resistance value ratio of the vertical resistance component R29 to the horizontal resistance component R28 is kept constant even with variations of the etching amount, whereby high accuracy can be ensured.

While this embodiment uses n-type polycrystalline silicon as the resistors formed on the sensor device 1, the same effect as that described above can also be obtained with the use of p-type polycrystalline silicon, n-type single-crystalline silicon, or p-type single-crystalline silicon by adjusting the resistance value ratio of the vertical resistance component to the horizontal resistance component to be substantially equal to the ratio of the piezoresistance coefficient πl to πt. Further, the same effect can be obtained in the case of using the resistors made of a metal, e.g., platinum.

Figure 6:
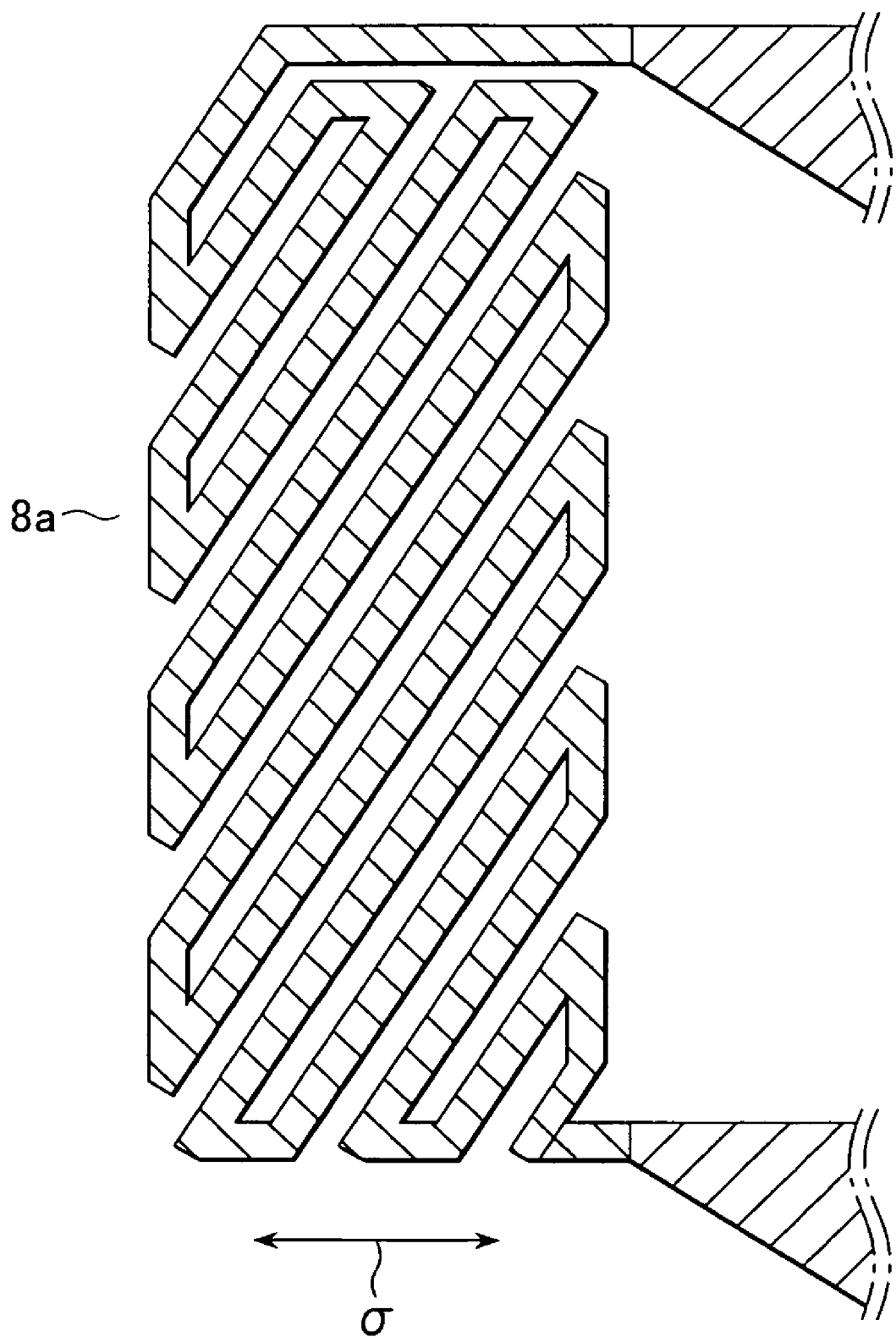
FIG. 6 is a plan view showing another shape of the temperature sensitive resistor in the first embodiment.

Alternatively, by forming, as shown in FIG. 6, the temperature sensitive resistor 8a in a pattern extending oblique to the direction of the stress σ which is maximum in the stress distribution, it is also possible to make the resistance value ratio of the vertical resistance component to the horizontal resistance component of each resistor substantially equal to the ratio of the piezoresistance coefficient πl to πt, and hence to obtain the same effect as that described above with reference to FIG. 5.

Second Embodiment

A second embodiment will be described below with reference to FIG. 7. This embodiment also represents the case where the present invention is applied to the thermal air flow meter. Since the basic principle and structure are the same as those in the first embodiment, only different points are described here and a description of common points is omitted.

Figure 7:
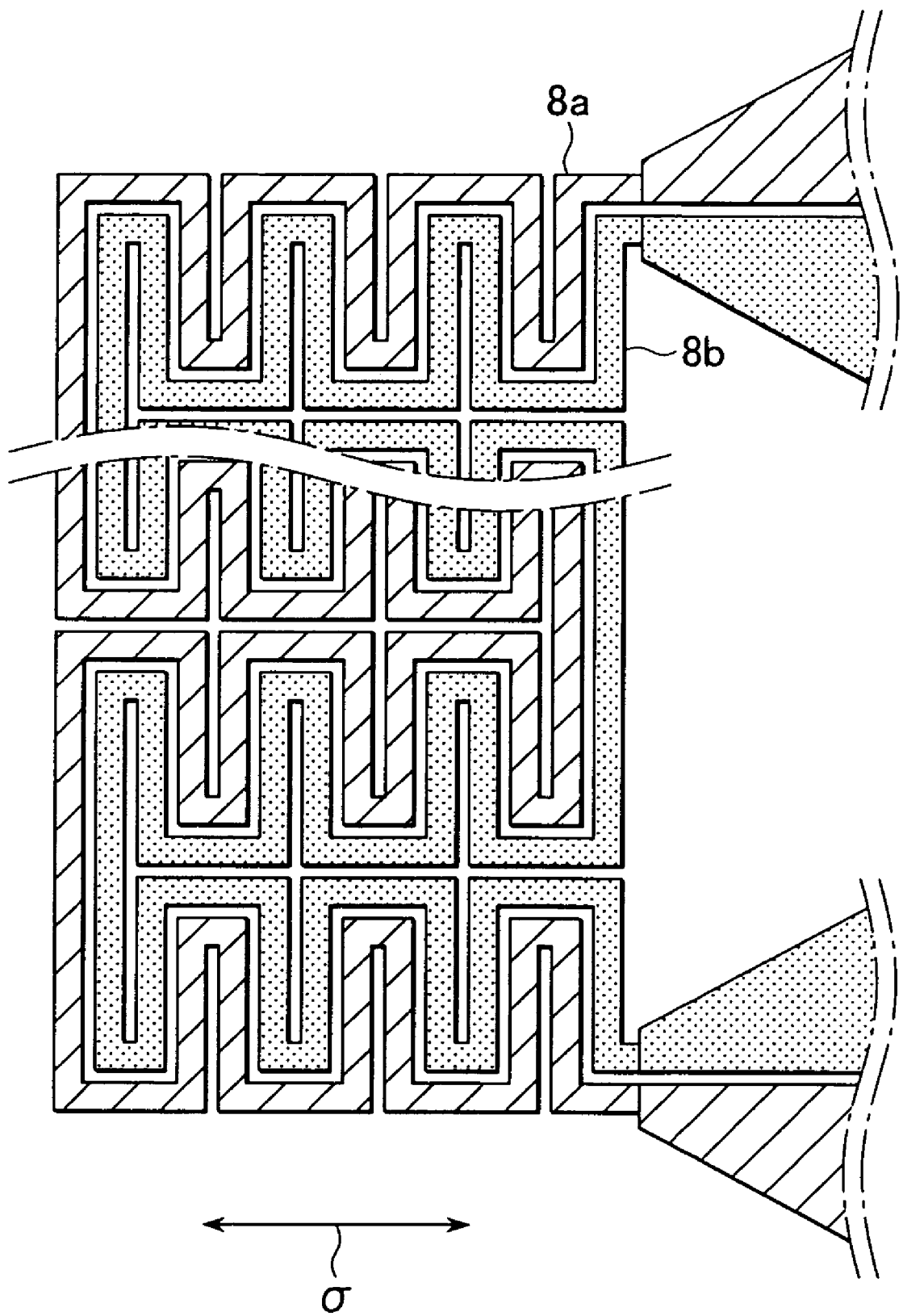
FIG. 7 is a plan view showing shapes of temperature sensitive resistors in a second embodiment of the present invention.

FIG. 7 is a plan view showing shapes of the temperature sensitive resistors 8a and 8b in this second embodiment. While in the first embodiment the temperature sensitive resistors 8a and 8b are arranged in separate areas divided in the vertical direction along the length of the heating resistor 6, the temperature sensitive resistors 8a and 8b in the second embodiment are arranged in such a way that the respective vertical resistance components and the respective horizontal resistance components of the temperature sensitive resistors 8a and 8b are extended in interdigitated (or interlaced) relation in parallel as shown. Further, for each of the temperature sensitive resistors 8a and 8b, the vertical resistance component (perpendicular to σ) and the horizontal resistance component (parallel to σ), as viewed in the drawing, are formed to have a resistance value ratio between them which is substantially equal to the ratio of the piezoresistance coefficient πl to πt as in the first embodiment. In addition, each resistor is in the form of a strip having a constant width.

In manufacturing steps using the semiconductor process, resistivity of a polycrystalline silicon film forming each resistor varies within a wafer due to variations in the manufacturing steps, thus generating a distribution of resistivity in some cases. When the temperature sensitive resistors 8a and 8b are formed in the separated areas in a divided way as in the first embodiment, the resistance value ratios of the temperature sensitive resistors 8a and 8b may vary to some extent due to the influence of such a resistivity distribution. The thermal air flow sensor of this embodiment has the bridge circuit made up of four temperature sensitive resistors and obtains an electric output depending on the air flow rate. Accordingly, if the resistance values of the temperature sensitive resistors 8a and 8b vary, the symmetry of the bridge circuit is changed, thus resulting in deterioration of the measurement accuracy.

With this embodiment, because of the temperature sensitive resistors having the interlaced shapes shown in FIG. 7, the temperature sensitive resistors 8a and 8b can be formed substantially in the same area. Accordingly, even if the resistivity distribution is generated within the wafer, the resistance value ratios between the temperature sensitive resistors 8a and 8b can be held substantially constant and the symmetry of the bridge circuit can be maintained.

Further, even when a temperature distribution is generated in the lengthwise direction of the heating resistor 6, the temperature sensitive resistors 8a and 8b are exposed to substantially the same temperature, and therefore the balance of the bridge circuit can be kept in a symmetrical state.

Thus, according to this embodiment, it is possible to reduce variations of the resistance values and to measure the air flow rate with high accuracy.

Similarly to the first embodiment, while this second embodiment uses n-type polycrystalline silicon as the resistors formed on the sensor device 1, the same effect as that described above can also be obtained with the use of p-type polycrystalline silicon, n-type single-crystalline silicon, or p-type single-crystalline silicon by adjusting the resistance value ratio of the vertical resistance component to the horizontal resistance component of each resistor to be substantially equal to the ratio of the piezoresistance coefficient πl to πt. Further, the same effect can be obtained in the case of using the resistors made of a metal, e.g., platinum.

Third Embodiment

A third embodiment will be described below. This embodiment represents the case where the present invention is applied to an acceleration sensor of the type employing a heating resistor, which can be used as an acceleration sensor and an inclination sensor in an automobile, etc.

One example of the known heating-resistor acceleration sensor is disclosed in U.S. Pat. No. 5,581,034.

Figure 8:
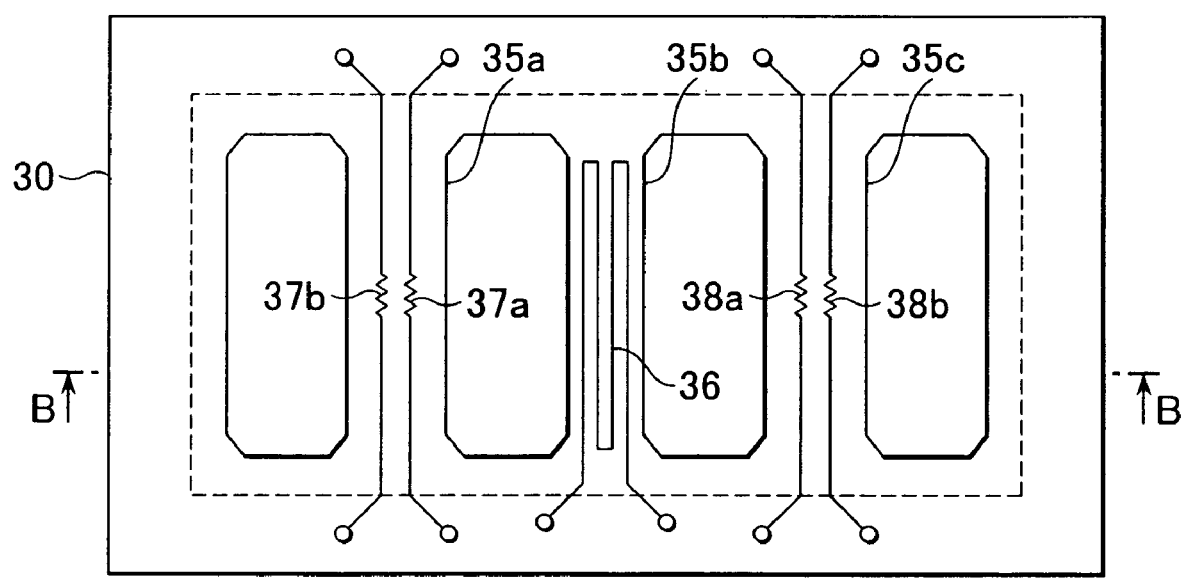
FIG. 8 is a schematic plan view of a sensor device according to a third embodiment of the present invention.
Figure 9:
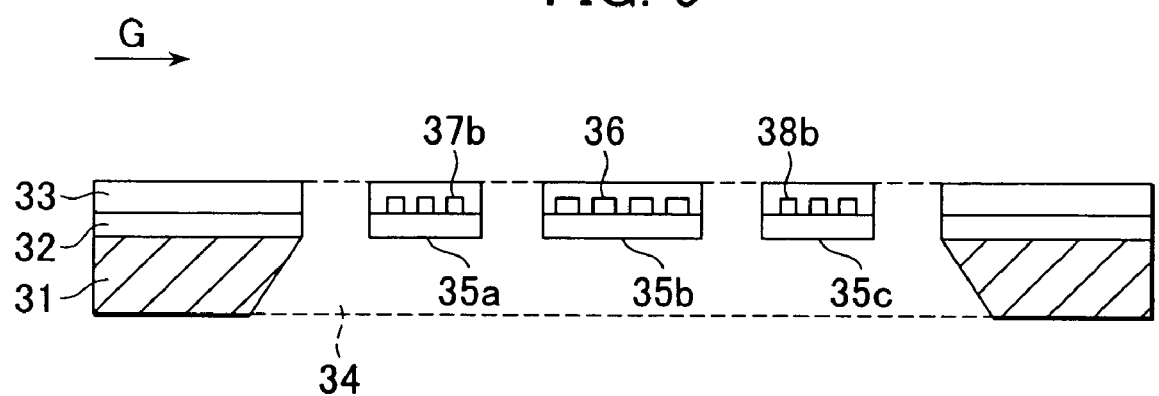
FIG. 9 is a vertical sectional view of the sensor device according to the third embodiment.

FIG. 8 is a schematic plan view of a sensor device of a thermal acceleration sensor according to the second embodiment, and FIG. 9 is a sectional view taken along the line B-B in FIG. 8. Though not shown in these drawings, a sensor device 30 is mounted in an enclosed container which is filled with a fluid having a small thermal conductivity, such as air or xenon (Xe).

As shown in FIGS. 8 and 9, the sensor device 30 is entirely formed by using, as a base, a semiconductor substrate 31 made of a single-crystalline silicon (Si) wafer. A cavity 34 is formed in a part of the semiconductor substrate 31. The cavity 3 is in the form of a rectangular hole as viewed in a plan. Doubly supported beams 35a, 35b and 35c are formed at one side of the cavity 34. A heating resistor 36 and temperature sensitive resistors 37a, 37b, 38a and 38b are formed on the doubly supported beams 35a, 35b and 35c as shown.

Those resistors are made of polycrystalline silicon and are each formed through steps of forming a polycrystalline silicon layer on an electric insulating film 32 by CVD, for example, and etching it into the desired shape. More specifically, those resistors are formed, for example, by doping phosphorous (P) in n-type polycrystalline silicon by thermal diffusion or ion implantation so that the desired resistance values and resistance-temperature coefficients are obtained.

Looking at, by way of example, the temperature sensitive resistor 37a, it has combined resistance of resistance components in two vertical and horizontal directions orthogonal to each other, and is formed such that a ratio of a resistance value of the vertical resistance component to a resistance value of the horizontal resistance component is substantially equal to the ratio of the piezoresistance coefficient πl to πt. The other temperature sensitive resistors 37a, 37b and 38b are also formed in the same manner. The concrete shape of each temperature sensitive resistor will be described in detail later with reference to FIG. 11. In addition, an electric insulating film 33 is formed to protect those resistors.

The doubly supported beams 35a, 35b and 35c and the resistors formed on them are manufactured as follows. One surface of the semiconductor substrate 31 is initially entirely coated with the electric insulating film 32. The electric insulating film 32 is silicon dioxide (SiO$_2$) formed by thermal oxidation or CVD (Chemical Vapor Deposition). The heating resistor 36 and the temperature sensitive resistors 37a, 37b, 38a and 38b are formed on the electric insulating film 32, and another electric insulating film 33 is formed on those resistors. Further, the electric insulating films 32 and 33 are partly removed by etching to have the desired shape. Then, the other surface of the semiconductor substrate 31 is partly removed by anisotropic etching to form the cavity 34. Through the above-described process, the sensor device 30 is manufactured.

The operating principle of the sensor device 30 will be described below. When a current is supplied to the heating resistor 36 for heating it, the temperature of an ambient fluid rises and the density of the ambient fluid reduces. When an acceleration G is applied in that state in a direction indicated by an arrow in FIG. 9, the fluid is relatively moved in a direction opposed to the acceleration G, thus causing convection. Accordingly, the temperature distribution in the enclosed container is changed such that the temperature of the temperature sensitive resistors 37a and 37b is higher than that of the temperature sensitive resistors 38a and 38b. Because such a temperature difference is changed depending on the magnitude of the acceleration G, a signal corresponding to the acceleration G can be obtained by taking out, as an electric signal, changes in the resistance values of the temperature sensitive resistors 37a, 37b, 38a and 38b caused by the temperature changes thereof.

Figure 10A:
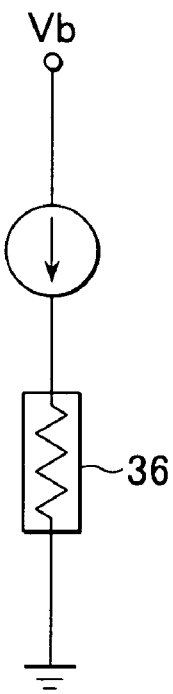
FIGS. 10A and 10B are diagrams showing a drive circuit for the sensor device according to the third embodiment.
Figure 10B:
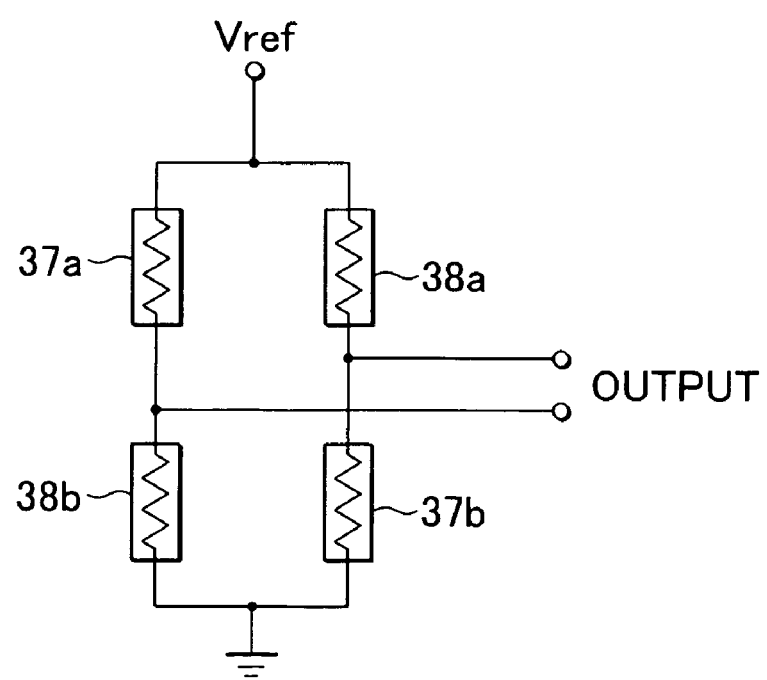

FIGS. 10A and 10B show a drive circuit for driving the sensor device 30 and obtaining a signal corresponding to the acceleration. Specifically, FIG. 10A shows a circuit for supplying a current to the heating resistor 36 for heating it, and FIG. 10B shows a bridge circuit for detecting the temperature difference between the temperature sensitive resistors 37a, 37b and the temperature sensitive resistors 38a and 38b.

In the heating-resistor acceleration sensor thus constructed, the heating resistor 36 and the temperature sensitive resistors 37a, 37b, 38a and 38b are formed on doubly supported beams 35a, 35b and 35c to ensure satisfactory thermal insulation for those resistors. The doubly supported beams have low mechanical strength and are susceptible to stresses. Therefore, the resistance value of each of the resistors formed on the doubly supported beams is changed with the piezoresistance effect.

Figure 11:
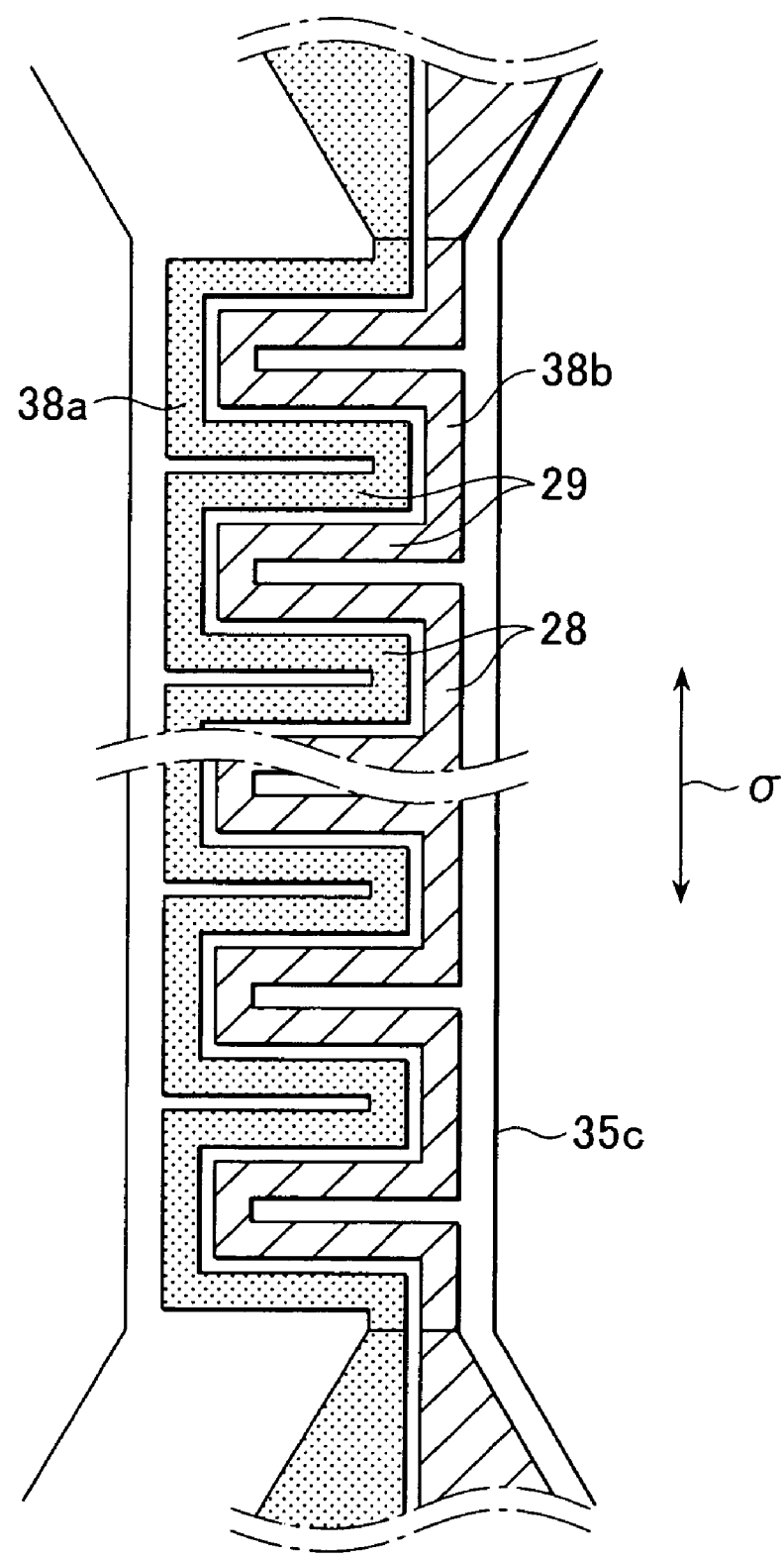
FIG. 11 is a plan view showing shapes of temperature sensitive resistors in the third embodiment.

FIG. 11 shows shapes of the temperature sensitive resistors arranged so as to reduce the influence of stress σ indicated in the drawing. As shown, the temperature sensitive resistors 38a and 38b each having a constant width are formed such that their respective vertical resistance components 29 and respective horizontal resistance components 28 are extended in interdigitated (or interlaced) relation in parallel. Further, for each of the temperature sensitive resistors 38a and 38b, a ratio of the resistance value of the vertical resistance component (perpendicular to σ) to the resistance value of the horizontal resistance component (parallel to σ), as viewed in the drawing, is substantially equal to the ratio of the piezoresistance coefficient πl to πt. In this embodiment, the temperature sensitive resistors 38a and 38b are each formed of polycrystalline silicon and the relationship between the piezo-resistance coefficient πl and πt is expressed by the above-mentioned formula (2). Accordingly, the temperature sensitive resistors 38a and 38b in this embodiment are each formed such that the length of the vertical resistance component 29 is triple the length of the horizontal resistance component 28. With such an arrangement, the influence of the stress σ is canceled and changes of the resistance values are reduced, whereby the measurement accuracy of the heating-resistor acceleration sensor is improved.

Similarly to the first and second embodiments, while this third embodiment uses n-type polycrystalline silicon as the resistors formed on the sensor device 30, the same effect as that described above can also be obtained with the use of p-type polycrystalline silicon, n-type single-crystalline silicon, or p-type single-crystalline silicon by adjusting the resistance value ratio of the vertical resistance component to the horizontal resistance component to be substantially equal to the ratio of the piezo-resistance coefficient πl to πt. Further, the same effect can be obtained in the case of using the resistors made of a metal, e.g., platinum.

Moreover, similarly to the first and second embodiments, this third embodiment can also reduce variations of the resistance value ratio caused by overetching because the temperature sensitive resistors 38*a* and 38*b* are formed in shapes having a constant width.

Fourth Embodiment

A fourth embodiment will be described below with reference to FIGS. 12-14.

This embodiment represents the case of preventing a reduction in accuracy of the flow rate measurement, which is caused by distortion of wiring resistances of the heating-resistor flow sensor, by employing a different method from that in the above-described embodiments. More specifically, if wiring portions of the resistors formed on the sensor device are distorted by stresses and resistance values of the wiring portions are changed correspondingly, an error is caused in the detected flow rate. This embodiment is intended to reduce such an error in the detected flow rate.

Figure 12:
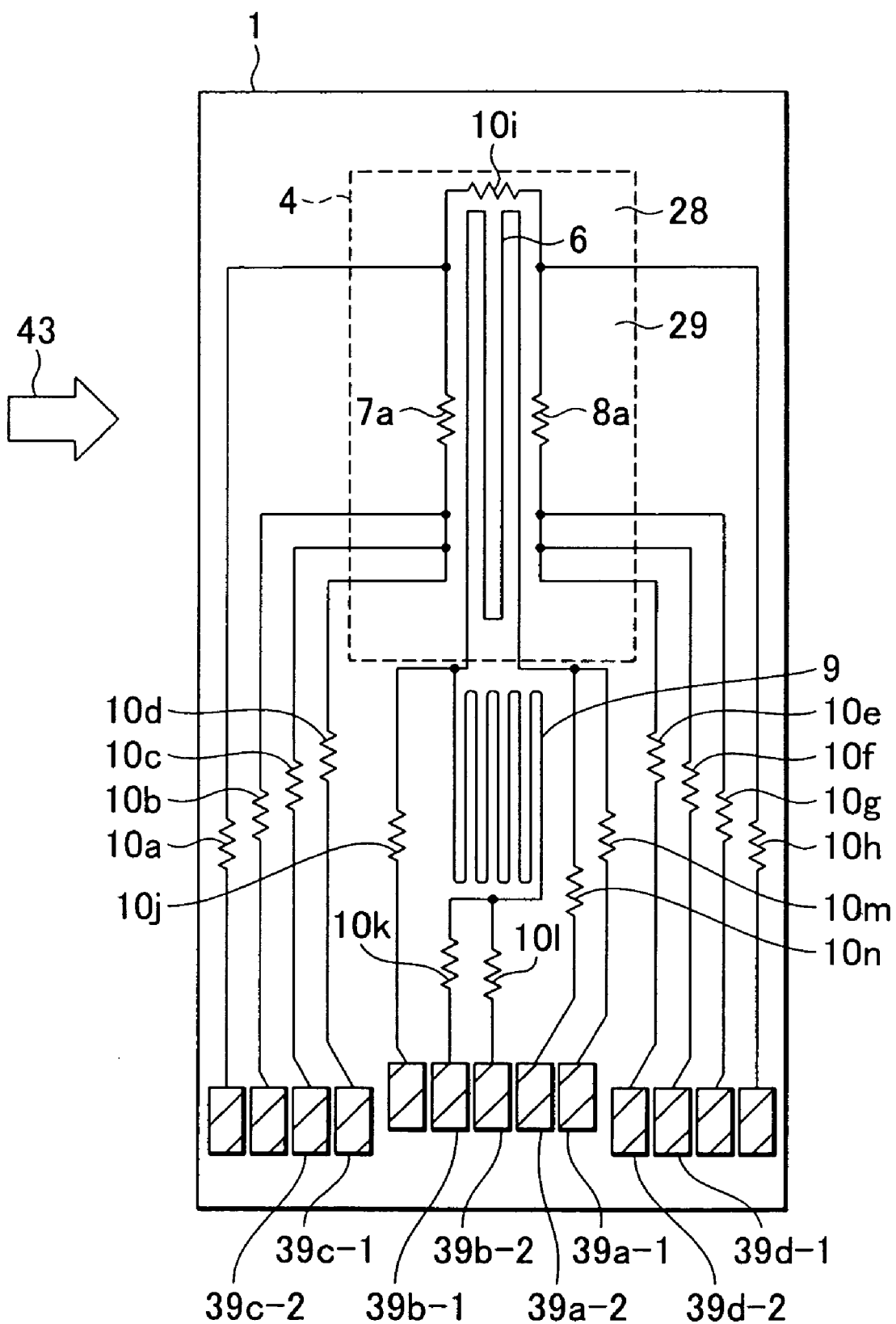
FIG. 12 is a schematic plan view of a sensor device according to a fourth embodiment of the present invention.
Figure 13:
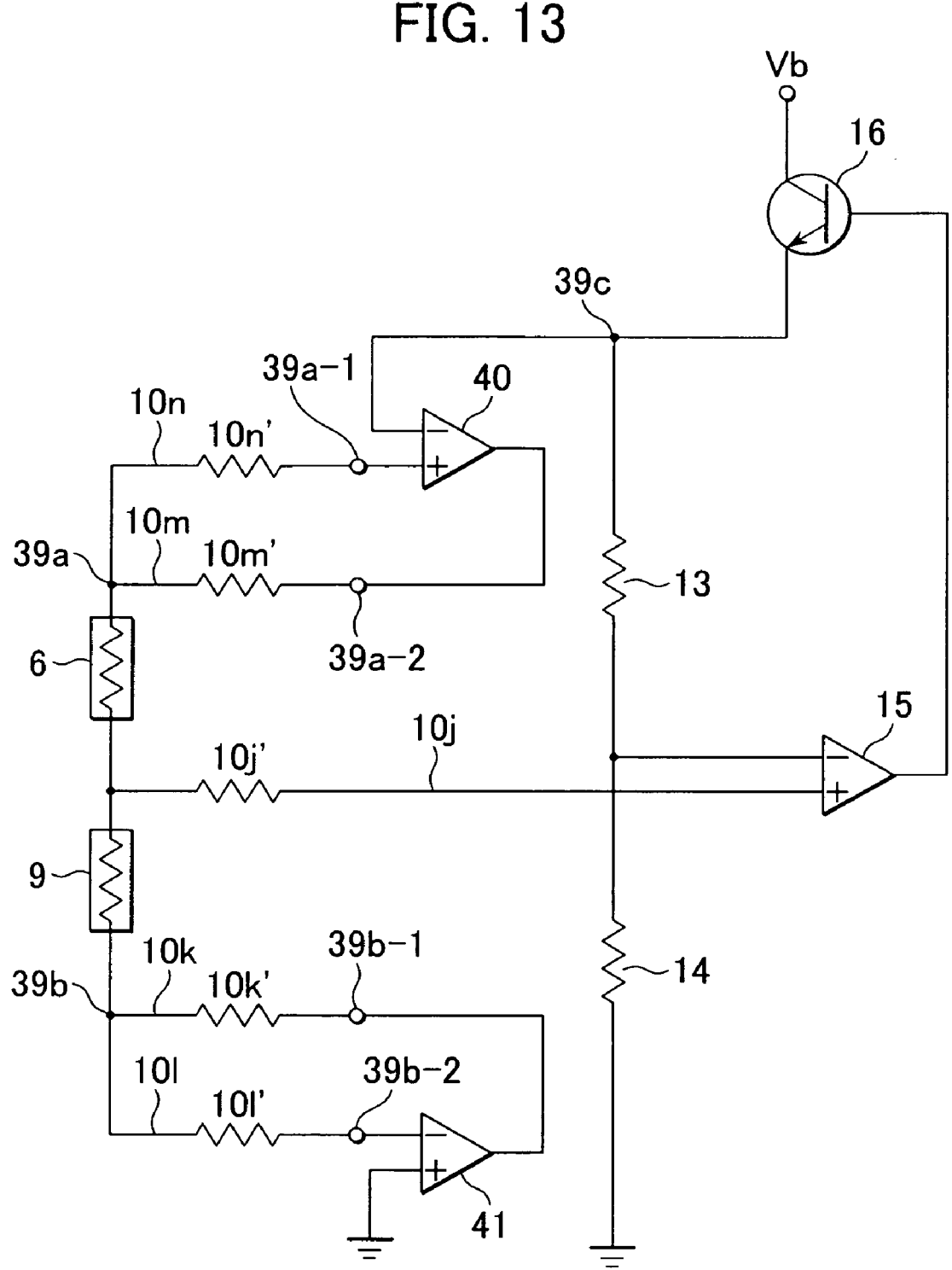
FIG. 13 is a diagram showing a part of a drive circuit for the sensor device according to the fourth embodiment.
Figure 14:
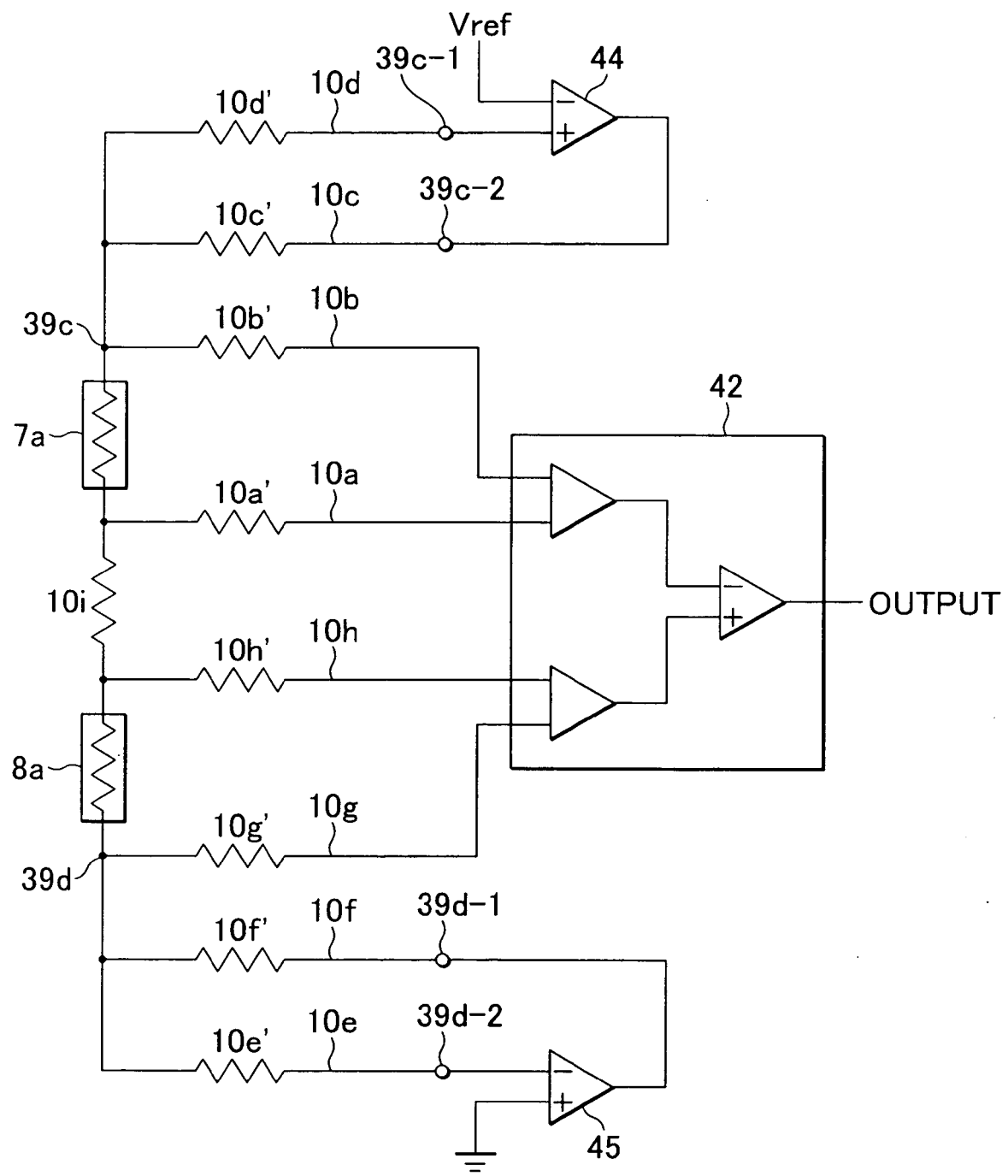
FIG. 14 is a diagram showing a part of the drive circuit for the sensor device according to the fourth embodiment.

FIG. 12 is a schematic plan view of a sensor device of a flow sensor according to this embodiment, FIG. 13 is a diagram showing an electric circuit for controlling the heating temperature of a heating resistor 6 on the sensor device according to this embodiment, and FIG. 14 is a diagram showing an electric circuit for detecting the temperature difference between the upstream and downstream sides of the heating resistor 6 by using temperature sensitive resistors 7*a* and 8*a*, and for obtaining an electric signal corresponding to an air flow rate. Since the basic operating principle, etc. of the flow sensor are the same as those in the first embodiment, only different points are described here.

Prior to explaining the sensor device shown in FIG. 12, the circuit diagrams shown in FIGS. 13 and 14 are first described.

The circuit of FIG. 13 for driving the heating resistor has a basically similar circuit configuration to that of the drive circuit shown in FIG. 1A. The drive circuit of FIG. 13 differs from the circuit of FIG. 1A in that one power-supply side terminal 39*a* of the heating resistor 6 and the temperature compensation resistor 9 connected in series is branched to two terminals 39*a*-1 and 39*a*-2 via wires 10*n* and 10*m*, and the other ground side terminal 39*b* is also similarly branched to two terminals 39*b*-1 and 39*b*-2 via wires 10*k* and 10*l*. In other words, the power-supply side terminal and the ground side terminal of the resistors connected in series are branched to at least four terminals in total.

The one wire 10*n* led from the one power-supply side terminal (positive side) 39*a* of the heating resistor 6 is connected to an inverted input terminal of a differential amplifier 40 through the terminal 39*a*-1, and a power supply potential 39*c* is connected to a non-inverted input terminal of the differential amplifier 40. An output terminal of the differential amplifier 40 is connected through the terminal 39*a*-2 to the other wire 10*m* led from the one power-supply side terminal 39*a* of the heating resistor 6.

With such an arrangement, even when the wires 10*m* and 10*n* led from the one power-supply side terminal 39*a* of the heating resistor 6 are distorted and the wiring resistances are changed, the potential at the one power-supply side terminal 39*a* of the heating resistor 6 can be always held equal to the power supply potential 39*c* with the function of the differential amplifier (feedback device) 40 disposed as shown. Incidentally, reference numerals 10*n*' and 10*m*' represent the wiring resistances of the wires 10*n* and 10*m*, respectively.

Likewise, the one wire 10*l* led from the other ground side terminal 39*b* of the temperature compensation resistor 9 is connected to an inverted input terminal of a differential amplifier 41 through the terminal 39*b*-2, and the ground potential is connected to a non-inverted input terminal of the differential amplifier 41. An output terminal of the differential amplifier 41 is connected to the other wire 10*k* led from the temperature compensation resistor 9 (i.e., to the other ground side terminal 39*a*) through the terminal 39*b*-1.

With such an arrangement, even when the wires 10*l* and 10*k* led from the other ground side terminal 39*b* of the temperature compensation resistor 9 are distorted and the wiring resistances are changed, the potential at the other ground side terminal 39*b* of the temperature compensation resistor 9 can be always held at the ground potential with the function of the differential amplifier (feedback device) 41 disposed as shown. Incidentally, reference numerals 10*l*' and 10*k*' represent the wiring resistances of the wires 10*l* and 10*k*, respectively. A midpoint potential between the heating resistor 6 and the temperature compensation resistor 9 is connected to the differential amplifier 15 via a wire 10*j*. Reference numeral 10*j*' represents the wiring resistance of the wire 10*j*.

The flow-rate measuring circuit of FIG. 14 is basically similar to the circuit of FIG. 1B except that the temperature sensitive resistor 7*a* and the temperature sensitive resistor 8*a* arranged respectively upstream and downstream of the heating resistor 6 are each constituted by one resistor.

Looking at the operating principle, potentials at both terminals of the temperature sensitive resistor 7*a* and potentials at both terminals of the temperature sensitive resistor 8*a* are inputted to a differential detection circuit 42 via wires 10*a* and 10*b* and wires 10*g* and 10*h*, respectively. The flow rate and direction of an air flow can be detected from the potential difference between the potentials across those resistors.

Also, in this embodiment, one power-supply side terminal 39*c* of one 7*a* of the two temperature sensitive resistors 7*a* and 8*a*, which are connected in series, is branched to two terminals 39*c*-1 and 39*c*-2 via wires 10*c* and 10*d*, and the other ground side terminal 39*d* is also similarly branched to two terminals 39*d*-1 and 39*d*-2 via wires 10*f* and 10*e*. In other words, the power-supply side terminal and the ground side terminal of the resistors connected in series are branched to at least four terminals in total.

The one wire 10*d* led from the one terminal 39*c* of the temperature sensitive resistor 7*a* is connected to an inverted input terminal of a differential amplifier 44 through the terminal 39*c*-1, and a reference potential Vref of a power supply is connected to a non-inverted input terminal of the differential amplifier-44. An output terminal of the differential amplifier 44 is connected to the one terminal 39*c* of the temperature sensitive resistor 7*a* through the terminal 39*c*-2 and the other wire 10*c*.

With such an arrangement, even when the wires 10*c* and 10*d* led from the one power-supply side terminal 39*c* of the temperature sensitive resistor 7*a* are distorted and the wiring resistances are changed, the potential at the one power-supply side terminal 39*c* of the temperature sensitive resistor 7*a* can be always held equal to Vref with the function of the differential amplifier (feedback device) 44. Incidentally, reference numerals 10*c*' and 10*d*' represent the wiring resistances of the wires 10*c* and 10*d*, respectively.

Likewise, the one wire 10*e* led from the other ground side terminal 39*d* of the temperature sensitive resistor 8*a* is connected to an inverted input terminal of a differential amplifier 45 through the terminal 39*d*-2, and the ground potential is connected to a non-inverted input terminal of the differential amplifier 45. An output terminal of the differential amplifier 45 is connected to the other wire 10f led from the temperature sensitive resistor 8a (i.e., to the other ground side terminal 39d) through the terminal 39d-1.

With such an arrangement, even when the wires 10e and 10f led from the other ground side terminal 39d of the temperature sensitive resistor 8a are distorted and the wiring resistances are changed, the potential at the other ground side terminal 39d of the temperature sensitive resistor 8a can be always held at the ground potential with the function of the differential amplifier (feedback device) 45 disposed as shown. Incidentally, reference numerals 10e' and 10f' represent the wiring resistances of the wires 10e and 10f, respectively.

Thus, according to the sensor device constructed as described above, even when the resistance values of the wires 10a to 10n are changed with the occurrence of stresses, the voltages applied to the heating resistor 6 and the temperature sensitive resistors 9, 7a and 8a are not changed, and hence the flow rate can be detected with high accuracy.

In the sensor device shown in FIG. 12, the heating resistor 6, the temperature compensation resistor 9, and the temperature sensitive resistors 7a and 8a are formed, and the terminals 39a-1, 39a-2, 39b-1, 39b-2, 39c-1, 39c-2, 39d-1 and 39d-2 connected to the above-mentioned feedback devices are formed.

Further, by combining this fourth embodiment with any of the first to third embodiments, it is possible to reduce the influence of stresses in both the detecting section and the wiring section, and to further increase the measurement accuracy.

What is claimed is:

1. A physical quantity sensor, comprising:
a substrate;
a rectangular diaphragm formed in said substrate; and
resistors for measuring a physical quantity constituting a voltage generated on said resistors, said resistors being formed on an electric insulating film on said diaphragm in a pattern of strips, said resistors including a horizontal resistor component and a vertical resistor component, and said horizontal resistor component and said vertical resistor component being orthogonal with each other,
wherein a ratio of a piezoresistance coefficient of the vertical resistor component to a piezoresistance coefficient of the horizontal resistor component is substantially equal to a resistance value ratio of the resistance value of the vertical resistor component to a resistance value of the horizontal resistor component, said piezoresistance coefficient of said vertical resistor component being obtained by imposing a stress to said vertical resistor component in a vertical direction, said piezoresistance coefficient of the horizontal resistor component is obtained by imposing a stress to said horizontal resistor component in a horizontal direction.

2. The physical quantity sensor according to claim 1, wherein said horizontal resistor component and said vertical resistor component are made of polycrystalline silicon doped with impurities, and the resistance value ratio of the horizontal resistor component to the vertical resistor component is equal to 3.

3. The physical quantity sensor according to claim 1, wherein said horizontal resistor component and said vertical resistor component are extended in interdigitated relation in parallel with each other.

4. The physical quantity sensor according to claim 1, wherein said resistors comprise a heating resistor and a temperature sensitive resistor, each having a power-supply side terminal and a ground side terminal which are branched to at least four terminals.

5. The physical quantity sensor according to claim 1, wherein the measured generated voltage is representative of air flow.

6. The physical quantity sensor according to claim 1, wherein the measured generated voltage is representative of acceleration.

7. A physical quantity sensor comprising:
a substrate;
a rectangular diaphragm formed in said substrate; and
resistors for measuring a physical quantity consisting of voltage generated on said resistors, said resistors being formed on an electric insulating film on said diaphragm in a pattern of strips, said resistors including a horizontal resistor component and a vertical resistor component, said horizontal resistor component and said vertical resistor component being orthogonal with each other,
wherein a ratio of the resistance value of the horizontal resistor component to a resistance value of the vertical resistor component is 0.5 times to 1.5 times a ratio of a piezoresistance coefficient of the horizontal resistor component to a piezoresistance coefficient of the vertical resistor component, said piezoresistance coefficient of the vertical resistor component being obtained by imposing a stress to said vertical resistor component in a vertical direction, and said piezoresistance coefficient of the horizontal resistor component is obtained by imposing a stress to said horizontal resistor component in a horizontal direction.

8. The physical quantity sensor according to claim 7, wherein said horizontal resistor component and said vertical resistor component are made of polycrystalline silicon doped with impurities, and the resistance value ratio of the horizontal resistor component to the vertical resistor component is equal to 3.

9. The physical quantity sensor according to claim 7, wherein said horizontal resistor component and said vertical resistor component are extended in interdigitated relation in parallel with each other.

10. The physical quantity sensor according to claim 7, wherein said resistors comprise a heating resistor and a temperature sensitive resistor, each having a power-supply side terminal and a ground side terminal which are branched to at least four terminals.

* * * * *